May 21, 1929.   H. JUNKERS   1,714,375
RUNNER FOR AIRCRAFT
Filed Nov. 21, 1925   2 Sheets-Sheet 1

Inventor:
Hugo Junkers
by
Atty.

May 21, 1929.  H. JUNKERS  1,714,375
RUNNER FOR AIRCRAFT
Filed Nov. 21, 1925   2 Sheets-Sheet 2
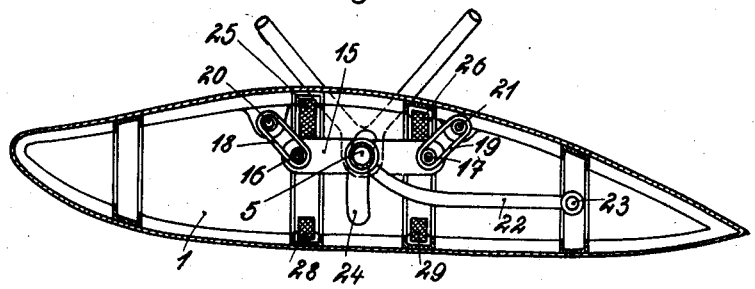
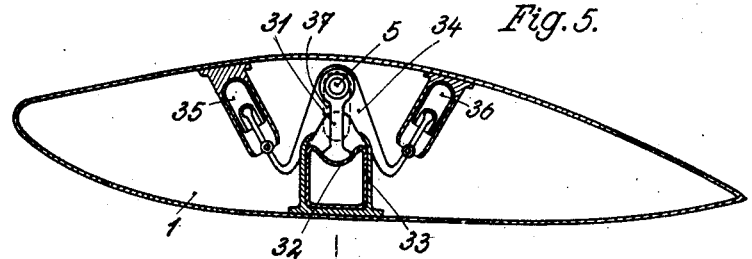
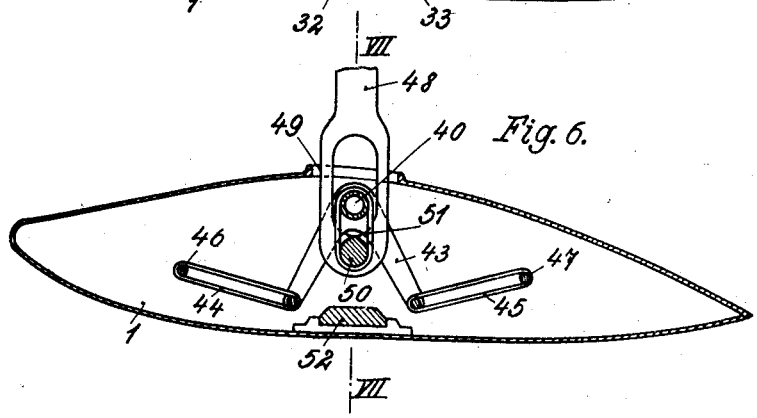
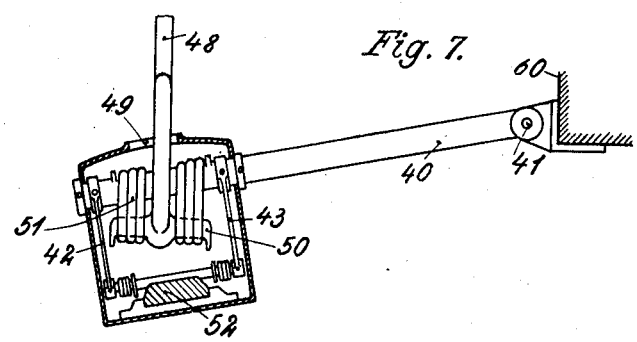
Inventor:
Hugo Junkers
by  Atty.

Patented May 21, 1929.

1,714,375

UNITED STATES PATENT OFFICE.

HUGO JUNKERS, OF DESSAU, GERMANY.

RUNNER FOR AIRCRAFT.

Application filed November 21, 1925, Serial No. 70,572, and in Germany December 13, 1924.

My invention refers to the runners used in connection with aircraft in order to enable it to land on ground covered with snow or ice. It is an object of my invention to provide runners which are so designed as to offer the least resistance in traveling through the air and to be more efficient in a general way than similar devices hitherto in use.

The runners hitherto used in connection with aircraft and more especially with flying machines have been designed similar to the well known snow-shoes and these runners have been of a very unfavorable shape as regards the resistance offered to the air, which is still increased by the means which are required for limiting the rotations of the runners about their transverse axis. It has therefore been proposed to provide horizontal balancing or stabilizing surfaces at the ends of the runners, these surfaces being designed to adjust the runners automatically during flight into the most favorable position as regards air resistance. However this arrangement involves the disadvantage that these surfaces must project beyond the runners and in consequence thereof offer a considerable additional resistance to which must be added the resistance offered by their supports. Moreover these stabilizing surfaces are apt to create trouble when landing on uneven ground.

In the runners according to the present invention the resistance offered to the air is greatly diminished in consequence of the particular shape and of special means whereby the runner is automatically maintained during flight in the most favorable position. This is obtained according to this invention by forming each runner as a hollow stream-lined girder and by locating within this hollow body the means for automatically adjusting the runner and for keeping it in the most favorable position. These adjusting means, which preferably have the form of a spring suspension acting in opposite directions, at the same time limit the tendency of the runner to turn about its transverse axis. Runners of this kind are apt to further diminish the air resistance of the craft inasmuch as all shock-absorbing devices required for taking up the shocks arising on starting and landing, such as spring suspensions, ordinary shock-absorbers, stretching bodies, checks and the like, are withdrawn to the action of the free air current and are housed within the hollow runners. Preferably the spring suspensions serving for taking up the mass forces of the craft are at the same time utilized for holding the runner in the most favorable position and for limiting its rotations about its transverse axis.

The streamlined shape of the hollow runner and the fact that all accessories, which were hitherto exposed to the free air current, can now be hidden in the runner, thus contribute to diminish the total air-resistance of the craft and to greatly improve its aerodynamic properties. Moreover these runners warrant the smooth and safe landing.

In the drawings affixed to this specification and forming part thereof several embodiments of my invention are illustrated diagrammatically by way of example.

In the drawings—

Fig. 1 is an elevation partly in section and

Fig. 2 a plan view, partly in longitudinal section, while

Figs. 4, 5 and 6 are vertical longitudinal sections of so many different modifications, and Fig. 7 is a cross-section on the line VII—VII in Fig. 6, showing the runner mounted on the craft.

Figure 1:
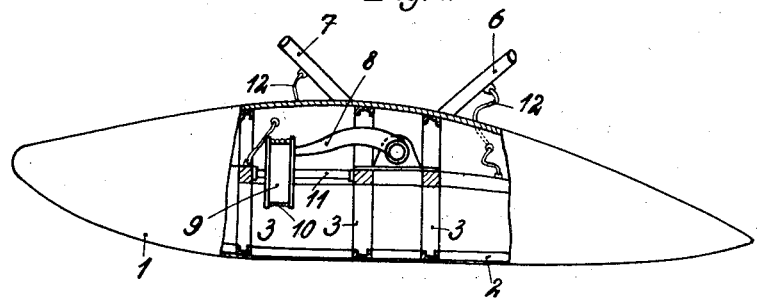
Figure 2:
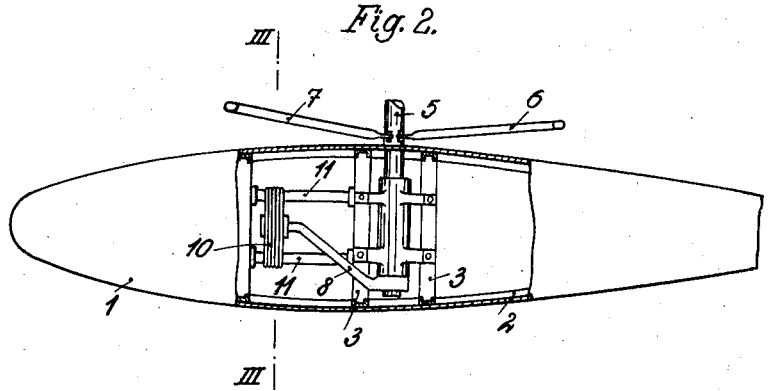
Figure 3:
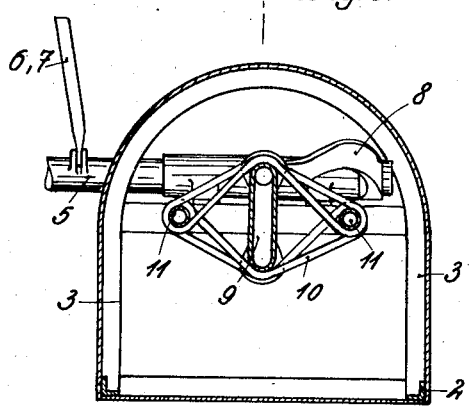
Fig. 3 is a cross-section drawn to a larger scale on the line III—III in Fig. 2, of the first form.

Referring first to Figs. 1 to 3, 1 is the stream-lined shell of the runner which covers a structure consisting of longitudinal members 2 and cross members 3. The runner is mounted on the axle 5 of the landing gear, for instance the wheel axle from which the wheels have been removed, this axle being supported by stays 6 and 7 as usual.

On the end of the axle 5 is rigidly mounted a lever 8, the free end of which carries a member 9 extending between the rubber suspension 10 mounted on a pair of horizontal supports 11. 12 are short ropes attached to the stays 6 and 7 respectively, and to the parts of the inner structure of the runner, these ropes serving for preventing a tilting of the runner in case that the rubber suspension means should be torn.

In the operation of this device the runner, on oscillating about the axle 5, will be kept in horizontal position by the member 9 rigidly connected with the axle 5 which serves as an abutment for the spring suspension means 10, which thus prevents the runner from turning about this axle. The forces arising on starting or landing are not taken up by these spring suspension means, but by separate shock-absorbing means (not shown), which are preferably mounted on the stays 6, 7.

In the modification illustrated in Fig. 4 the spring suspension hidden within the hollow body of the runner at the same time serves for absorbing the shocks arising on starting, landing and gliding, for counteracting the tendency of the runner to rotate about its transverse axis and for adjusting the runner into its most favorable position during flight. With the landing gear axle 5 is rigidly connected a cross-beam 15, which carries at its ends members 16 and 17, respectively, for holding endless coil springs 18, 19 which are suspended from similar members 20, 21 fixed to the runner structure in such manner, that when the craft is resting on the ground, these springs will take up its load, being distended accordingly. Rubber checks 28, 29 mounted on the bottom of the runner serve for limiting the stroke of the cross-beam 15. The axle 5 is guided by links 22 having one end pivoted to pins 23 fixed to the runner structure. A slot 24 in the side wall of the runner allows the axle to move freely relative to the runner. During flight the coil springs 18, 19 pull the runner downwards, and in this position rubber checks 25, 26 mounted near the top of the runner rest on the cross-beam 15, thereby fixing the runner in position relative to the craft. These latter checks may also be replaced by tension springs adapted to counteract springs 18, 19 by pulling the runner upwards. The combined action of two pairs of such springs will then result in a predetermined middle position of the runner during flight. Obviously the double springs here used can also be replaced by simple springs capable of taking up tensional and compression strains.

In the modification illustrated in Fig. 5, the absorbing of the shocks as well as the adjusting of the runner during flight and the limiting of rotary movements of the runner is effected by means of air compression and expansion. To the axle 5 of the landing gear is pivoted an arm 31, the lower end of which is applied onto a flexible diaphragm 32 having the form of an entirely closed hollow body filled with air, which is enclosed in a case 33 mounted on the bottom of the runner. On the runner being loaded by the weight of the craft, the arm 31 will cause the top wall of the diaphragm to be bent inwards until the inner pressure created thereby will suffice to counterbalance the load. The limiting of rotary movement of the runner and the adjusting of the runner into the most favorable position during flight is effected by means of similar pneumatic devices 35, 36 acting on the ends of a double-armed lever 34, rigidly mounted on the axle 5. If the runner is turned relative to the craft about its middle position, the diaphragm of one or the other pneumatic device will be forced inwards, thereby increasing the pressure within the diaphragm, and such increase of pressure will act towards carrying the runner back into its middle position. The axle is guided by a vertical slot 37 provided in the side wall of the runner.

In the modification illustrated in Figs. 6 and 7 the runner is pivotally mounted on one end of an arm 40, the other end of which is pivoted at 41 to the hull or body 60 of the craft. Two double-armed levers 42, 43 rigidly mounted on the arm 40 serve for adjusting the runner in the most favorable position during flight. Crossbars 46, 47 mounted in the side walls of the runner have endless coil springs or the like 44, 45 suspended from them, these springs also embracing pins mounted at the ends of the double-armed levers 42, 43 and thereby holding the runner in the most favorable position. The shocks arising on starting and landing are absorbed by means of a rod 48, one end of which is fixed to a part of the craft, while its lower end extends through a slot 49 in the top of the runner into the interior thereof and carries a cross-beam 50 suspended in endless coil springs or rubber suspensions 51 wound about the arm 40. A rubber check 52 mounted on the bottom of the runner serves for limiting the stroke of the arm 48. This modification offers the advantage as compared with the modifications described above that the bending strains exerted on the axle carrying the runner is greatly diminished, the guide slot provided in the side wall of the runner being also dispensed with. This is important in so far as it is difficult to provide a good packing for this slot which will securely prevent snow from entering the runner.

I wish it to be understood that I do not desire to be limited to the exact details of construction shown and described for obvious modifications will occur to a person skilled in the art.

I claim:—

1. Runner for the landing and starting gear of aircraft having the form of a streamlined hollow girder, a horizontal axis extending through the interior of said runner and a resilient suspension within said runner adapted, when in its middle position, to keep the runner in its most favorable position during flight.

2. Runner for the landing and starting gear of aircraft having the form of a streamlined hollow girder, a horizontal axis extending through the interior of said runner and means within said runner for limiting oscillation of the runner about said axle and for absorbing the shocks arising in landing and starting.

3. Runner for the landing and starting gear of aircraft having the form of a streamlined hollow girder and common means within said girder adapted at the same time to absorb the shocks arising in landing and starting and to adjust the runner into its most favorable position during flight.

4. Runner for the landing and starting gear of aircraft having the form of a streamlined hollow girder and common means within said girder adapted at the same time to absorb the shocks arising in landing and starting and to adjust the runner into its most favorable position during flight, said means comprising a member rigidly connected with the aircraft and an elastic check connected with said girder.

5. Runner for the landing and starting gear of aircraft having the form of a streamlined hollow girder and common means within said girder adapted to absorb the shocks arising in landing and starting and to adjust the runner into its most favorable position during flight, said means comprising a member rigidly connected with the aircraft and projecting into said girder and resilient means inserted between said member and the runner for taking up forces acting in opposite positions.

6. Runner for the landing and starting gear of aircraft having the form of a streamlined hollow girder, a horizontal axle on the craft extending into said girder, an arm rigidly mounted on said axle and resilient suspension means inserted between said arm and said girder in such manner as to keep said runner in the most favorable position during flight.

In testimony whereof I affix my signature.

HUGO JUNKERS.